(12) United States Patent
Nakano

(10) Patent No.: US 8,261,906 B2
(45) Date of Patent: Sep. 11, 2012

(54) RUBBER COMPOSITION FOR CONVEYOR BELT, AND CONVEYOR BELT

(75) Inventor: Hiroki Nakano, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/265,091

(22) PCT Filed: Apr. 19, 2010

(86) PCT No.: PCT/JP2010/056922
§ 371 (c)(1),
(2), (4) Date: Oct. 18, 2011

(87) PCT Pub. No.: WO2010/122978
PCT Pub. Date: Oct. 28, 2010

(65) Prior Publication Data
US 2012/0031742 A1 Feb. 9, 2012

(30) Foreign Application Priority Data
Apr. 20, 2009 (JP) ................................. 2009-101588

(51) Int. Cl.
*B65G 15/34* (2006.01)
(52) U.S. Cl. ........................................ 198/847; 198/846
(58) Field of Classification Search .................. 198/846, 198/847
See application file for complete search history.

(56) References Cited

U.S. PATENT DOCUMENTS

| | | | | |
|---|---|---|---|---|
| 3,596,753 | A * | 8/1971 | Knapp et al. ................... | 198/847 |
| 4,004,467 | A * | 1/1977 | Kenney ........................ | 198/847 |
| 4,547,422 | A * | 10/1985 | Oliver et al. .................... | 198/847 |
| 4,609,499 | A | 9/1986 | Esashi et al. | |
| 4,745,023 | A * | 5/1988 | Chapman et al. .............. | 198/847 |
| 5,098,946 | A * | 3/1992 | Kawazura et al. ............. | 524/398 |
| 5,161,677 | A * | 11/1992 | Beecher ........................ | 198/847 |
| 5,614,267 | A * | 3/1997 | Howlett ........................ | 198/847 |
| 5,941,369 | A * | 8/1999 | Katsura et al. ................ | 198/847 |
| 6,994,209 | B2 * | 2/2006 | Cediel et al. ................... | 198/847 |
| 7,939,175 | B2 * | 5/2011 | Alexander et al. ............ | 198/846 |

FOREIGN PATENT DOCUMENTS

| | | |
|---|---|---|
| JP | 60-158230 A | 8/1985 |
| JP | 2005-350491 A | 12/2005 |
| JP | 2006-176580 A | 7/2006 |
| JP | 2006-312744 A | 11/2006 |

* cited by examiner

*Primary Examiner* — James R Bidwell
(74) *Attorney, Agent, or Firm* — Sughrue Mion, PLLC

(57) ABSTRACT

Disclosed is a rubber composition for a conveyor belt, which is characterized by containing 0.5-3 parts by weight of zinc dimethacrylate, 1-10 parts by weight of a cobalt neodecanoate compound and 0.5-4 parts by weight of cobalt stearate per 100 parts by weight of the rubber component. Also disclosed is a conveyor belt in which a galvanized steel cord that is covered with an adhesive rubber layer is arranged as the core body between cover rubber layers, said conveyor belt being characterized in that the adhesive rubber layer is formed from the above-described rubber composition. The rubber composition has excellent adhesion to a galvanized steel cord, good rolling performance and good laminatability. The conveyor belt using the rubber composition has excellent durability and productivity.

9 Claims, 1 Drawing Sheet

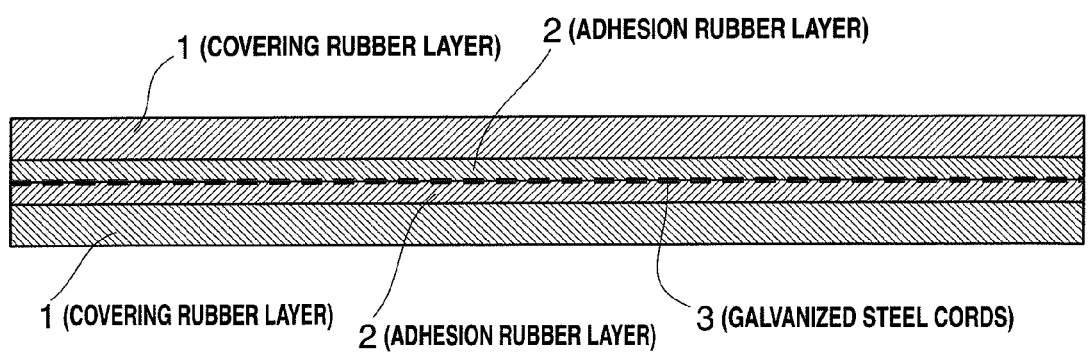

RUBBER COMPOSITION FOR CONVEYOR BELT, AND CONVEYOR BELT

CROSS REFERENCE TO RELATED APPLICATIONS

This application is a National Stage of International Application No. PCT/JP2010/056922 filed on Apr. 19, 2010, which claims priority from Japanese Patent Application No. 2009-101588, filed on Apr. 20, 2009, the contents of all of which are incorporated herein by reference in their entirety.

TECHNICAL FIELD

The present invention relates to a rubber composition for conveyor belts which excels in adhesion to galvanized steel cords and has a favorable rolling performance and efficient productivity of conveyor belts, and also to a conveyor belt formed with the rubber composition.

BACKGROUND ART

Among reinforcing materials used for rubber compositions are galvanized steel cords, which are suitable for conveyor belts (reinforced with steel cords) working in a humid environment on account of their excellent corrosion resistance. Such galvanized steel cords are required to keep good adhesion to rubber for an extended period of time under high humid conditions so that they ensure a long life for conveyor belts.

There have been proposed several methods for achieving good adhesion between rubber and galvanized steel cords, which involve incorporation of rubber component with rosin, an organic cobalt salt, and an organic chlorine compound in combination (Patent Document 1: JP-A 2006-312744), incorporation of rubber component with any one of triazine, zinc dimethacrylate, and zinc diacrylate, and an organic cobalt in combination (Patent Document 2: JP-A 2005-350491), or incorporation of rubber component with an acid-modified polymer and zinc dimethacrylate in combination (Patent Document 3: JP-A 2006-176580).

However, the foregoing conventional technologies permit improved adhesion between rubber and galvanized steel cords but are not intended to improve rolling performance at the time of sheeting and to improve laminating performance at the time of bonding rubber layers together. Such rolling and laminating performances are important factors in industrialization that greatly affect the productivity of conveyor belts. A conceivable way of improving the rolling performance is to lower adhesion by adding stearic acid or a zinc salt of an unsaturated fatty acid. While the rolling performance in this way is improved, workability in laminating performance is greatly lowered due to great lowering of adhesion, thereby degrading laminating performance.

Consequently, there has been a demand of a new rubber composition for conveyor belts which exhibits good adhesion to galvanized steel cords and good durability in a severe working environment under humid and hot conditions and also exhibits improved rolling performance without any adverse effect on laminating performance, so that it permits efficient production of conveyor belts.

PRIOR ART DOCUMENTS

Patent Documents

Patent Document 1: JP-A 2006-312744
Patent Document 2: JP-A 2005-350491
Patent Document 3: JP-A 2006-176580

SUMMARY OF THE INVENTION

Problems to be Solved by the Invention

The present invention is completed in view of the foregoing. It is an object of the present invention to provide a rubber composition for conveyor belts which excels in adhesion to galvanized steel cords and exhibits good rolling performance and laminating performance. It is another object of the present invention to provide a conveyor belt formed with the rubber composition which excels in durability and productivity.

Means for Solving the Problems

As the result of comprehensive researches for solution to the above-mentioned problems, the present inventors found that not only is it possible to improve adhesion between rubber and galvanized steel cords but it is also possible to improve rolling performance owing to adequate tackiness of rubber without any adverse effect on laminating performance, thereby allowing efficient production of durable conveyor belts, if organic cobalt to be added to the rubber together with zinc dimethacrylate for improvement in adhesion to galvanized steel cords is used in combination of cobalt neodecanoate and cobalt stearate in an adequate ratio. This finding led to the present invention.

The present invention is directed to a rubber composition for conveyor belts which contains 0.5 to 3 parts by weight of zinc dimethacrylate, 1 to 10 parts by weight of a compound of cobalt neodecanoate, and 0.5 to 4 parts by weight of cobalt stearate for 100 parts by weight of rubber component, and also to a conveyor belt of the type composed of covering rubber layers and a core of galvanized steel cords interposed between them which is coated with an adhesion rubber layer, characterized in that the adhesion rubber layer is formed from the rubber composition according to the present invention.

The present inventors' continued researches revealed that the rubber composition exhibits good adhesion if the rubber component is composed of natural rubber and synthetic rubber, such as styrene-butadiene rubber (SBR), in an adequate ratio and also if the rubber composition is incorporated with either or both of cobalt neodecanoate and cobalt neodecanoate boride as the compound of cobalt neodecanoate and also with any one of phenolic resin, particularly the one containing internally added hexamethylenetetramine, β-naphthol, and hexamethoxymethylated melamine (curing agent) in an adequate amount.

Thus, the present invention provides (1) to (8) as follows, as the preferred embodiments:

(1) the rubber composition for conveyor belts and the conveyor belt formed therewith according to the present invention, wherein the compound of cobalt neodecanoate is cobalt neodecanoate or cobalt neodecanoate boride which are used alone or in combination with each other.

(2) the rubber composition for conveyor belts and the conveyor belt formed therewith according to the present invention, wherein the rubber component contains 20 to 70 parts by weight of natural rubber and 80 to 30 parts by weight of synthetic rubber such that their total amount is 100 parts by weight.

(3) the rubber composition for conveyor belts and the conveyor belt formed therewith as defined in (2) above, wherein the synthetic rubber is one or more species selected from styrene-butadiene rubber (SBR), butadiene rubber (BR), and isoprene rubber (IR).

(4) the rubber composition for conveyor belts and the conveyor belt formed therewith according to the present invention, in which the rubber component contains 1 to 10 parts by weight of phenolic resin for 100 parts by weight thereof.

(5) the rubber composition for conveyor belts and the conveyor belt formed therewith as defined in (4) above, wherein the phenolic resin is the one which contains internally added hexamethylenetetramine.

(6) the rubber composition for conveyor belts and the conveyor belt formed therewith according to the present invention, in which the rubber component contains 1 to 10 parts by weight of β-naphthol for 100 parts by weight thereof.

(7) the rubber composition for conveyor belts and the conveyor belt formed therewith according to the present invention, in which the rubber component contains 1 to 10 parts by weight of hexamethoxymethylated melamine and/or hexamethylenetetramine as a curing agent for 100 parts by weight thereof.

(8) the conveyor belt composed of covering rubber layers and a core of galvanized steel cords interposed between them which is coated with an adhesion rubber layer, wherein the adhesion rubber layer is formed from the rubber composition according to the present invention.

ADVANTAGEOUS EFFECTS OF THE INVENTION

The rubber composition for conveyor belts according to the present invention excels in adhesion to galvanized steel cords and rolling performance and laminating performance, both required for efficient production of durable conveyor belts.

BRIEF DESCRIPTION OF DRAWING

FIG. 1 is a schematic sectional view showing the specimen used for adhesion test in the example.

EMBODIMENT FOR CARRYING OUT THE INVENTION

The rubber composition for conveyor belts according to the present invention is characterized in containing 0.5 to 3 parts by weight of zinc dimethacrylate, 1 to 10 parts by weight of a compound of cobalt neodecanoate, and 0.5 to 4 parts by weight of cobalt stearate for 100 parts by weight of its rubber component.

The rubber component as the constituent of the rubber composition according to the present invention may be any known one that is used as the adhesion rubber layer for steel cords in conveyor belts. It may be natural rubber or a mixture of natural rubber and synthetic rubber.

Examples of the synthetic rubber are listed below. Polyisoprene rubber (IR), polybutadiene rubber (BR), and polychloroprene rubber, which are homopolymers of such conjugated diene compounds as isoprene, butadiene, and chloroprene; styrene-butadiene copolymer rubber (SBR), vinylpyridine-butadiene-styrene copolymer rubber, acrylonitrile-butadiene copolymer rubber, acrylic acid-butadiene copolymer rubber, methacrylic acid-butadiene copolymer rubber, methacrylate-butadiene copolymer rubber, and methyl methacrylate-butadiene copolymer rubber, which are copolymers of the above-mentioned conjugated diene compound with such vinyl compound as styrene, acrylonitrile, vinylpyridine, acrylic acid, methacrylic acid, alkyl acrylates, and alkyl methacrylates; copolymers [such as isobutylene-isoprene copolymer rubber (IIR)] formed from olefins, such as ethylene, propylene, and isobutylene, and diene compounds; copolymer (EPDM) of olefins and non-conjugated dienes [such as ethylene-propylene-cyclopentadiene terpolymer, ethylene-propylene-5-ethylidene-2-nobornene terpolymer, and ethylene-propyene-1,4-hexadiene terpolymer]; polyalkenamer [such as polypentenamer] resulting from ring opening polymerization of cycloolefin; rubber [such as polyepichlorohydrin rubber capable of vulcanization with sulfur] which results from ring opening polymerization of oxrian rings; and polypropyleneoxide rubber. Additional examples include halides of the foregoing rubbers, such as chlorinated isobutylene-isoprene copolymer rubber (Cl—IIR) and brominated isobutylene-isoprene copolymer rubber (Br—IIR). Another example is a ring-opening polymer of norbornene. The above-mentioned rubbers may be used by blending with a saturated elastomer such as epichlorohydrin rubber, polypropyleneoxide rubber, or chlorosulfonated polyethylene. Incidentally, preferable among the foregoing synthetic rubbers is styrene-butadiene copolymer rubber (SBR).

The rubber component may be formed from the natural rubber and the synthetic rubber in any ratio without specific restrictions. The amount of the natural rubber is usually 20 to 70 parts by weight and preferably 20 to 50 parts by weight, and the amount of the synthetic rubber is usually 80 to 30 parts by weight and preferably 80 to 50 parts by weight, with their total amount being 100 parts by weight.

According to the present invention, the rubber composition for conveyor belts contains zinc dimethacrylate in an amount of 0.5 to 3 parts by weight, preferably 0.5 to 2 parts by weight, for 100 parts by weight of the rubber component mentioned above. The zinc dimethacrylate is intended to improve adhesion to galvanized steel cords. With an amount less than 0.5 parts by weight, it does not improve adhesion as intended in the present invention. With an amount more than 3 parts by weight, it results in excessively slow vulcanization which is undesirable for rolling performance and efficient production intended by the present invention.

In addition, according to the present invention, the rubber composition for conveyor belts contains zinc dimethacrylate and a compound of cobalt neodecanoate as mentioned above, so that it exhibits more effectively improved adhesion to galvanized steel cords. The compound of cobalt neodecanoate is not specifically restricted but its preferred examples include cobalt neodecanoate or cobalt neodecanoate boride. They may be used in combination with each other. The compound of cobalt neodecanoate improves not only adhesion but also the rate of vulcanization of the rubber composition by adding the cobalt neodecanoate boride.

The amount of the compound of cobalt neodecanoate should be 1 to 10 parts by weight for 100 parts by weight of the rubber component. The amount of cobalt neodecanoate should preferably be 2 to 6 parts by weight for 100 parts by weight of the rubber component. The amount of cobalt neodecanoate boride should preferably be 1.5 to 3.5 parts by weight for 100 parts by weight of the rubber component. Furthermore, if these are used in combination, the total amount should preferably be 1.5 to 5 parts by weight for 100 parts by weight of the rubber component. The compound of cobalt neodecanoate will fail to improve adhesion if its amount is lower than 1 part by weight and also result in heat aging, poor adhesion after moisture absorption, increased production cost, and poor rolling performance, if its amount exceeds 10 parts by weight.

The rubber composition according to the present invention is incorporated with cobalt stearate in combination with the compound of cobalt neodecanoate mentioned above. The cobalt stearate properly adjusts the tackiness of the rubber composition, thereby improving its rolling performance without any adverse effect on its laminating performance. The amount of cobalt stearate should be 0.5 to 3 parts by weight, preferably 0.5 to 2 parts by weight, for 100 parts by weight of the rubber component. The cobalt stearate will fail to improve rolling performance if its amount is less than 0.5 parts by weight and also result in poor adhesion and poor laminating performance due to reduced tackiness in the laminating step if its amount exceeds 3 parts by weight. Incidentally, the term "rolling performance" means processability for passing the kneaded rubber composition through sheeting rolls, thereby making it into belt-like rubber with a specific thickness and width.

The rubber composition according to the present invention may be incorporated with a phenolic resin in an adequate amount for further improvement in adhesion properties. Examples of the phenolic resin include phenol-formaldehyde resin, resorcinol-formaldehyde resin, and cresol-formaldehyde resin, with the first being preferable. The phenolic resin may be pure ones or modified ones such as those modified with natural resin or oil. Unrestrictive examples of the modified phenolic resin include the one with internally added hexamethylenetetramine (hexamine) or hexamethoxymethylated melamine (HMMM), which is preferable for improvement in adhesive properties, with the former being particularly desirable.

The phenolic resin may be added in any amount without specific restrictions. However, it should be added in an amount of 1 to 10 parts by weight, preferably 1 to 5 parts by weight, for 100 parts by weight of the rubber component. With an amount less than 1 part by weight, it does not fully produce its effect of adding. With an amount more than 10 parts by weight, it adversely affects the physical properties of the rubber compound, which leads to sticking to the kneading machine and poor rolling performance, ending up with an increased production cost. More than one phenolic resin may be used in combination.

For further improvement in adhesion strength, the rubber composition may be incorporated with a hydroxyl group-containing monocyclic aromatic compound such as resorcinol or a hydroxyl group-containing polycyclic aromatic compound such as β-naphthol, with the latter being preferable. The amount of these compounds is not specifically restricted. It is usually 1 to 10 parts by weight, particularly 1 to 5 parts by weight, for 100 parts by weight of the rubber component. With an amount less than 1 part by weight, it does not fully produce its effect of adding. With an amount more than 10 parts by weight, it deteriorates the physical properties of the rubber composition and it is wasted uneconomically. Incidentally, the β-naphthol should preferably be used in combination with hexamethoxymethylated melamine and/or hexamethyltetramine as a curing agent which is mentioned later.

The rubber composition may also be incorporated with a curing agent for its further improvement in adhesion strength. The curing agent is a methylene donor, such as hexamethylenetetramine and methylolated melamine derivative, with the latter including, for example, hexamethylolated melamine, hexamethoxymethylated melamine, hexaethoxymethylated malamine, N,N',N"-trimethyl-N,N',N"-trimethylolated melamine, N,N',N"-trimethylolated melamine, N-methylolated melamine, N,N'-di(methoxymethylated) melamine, and N,N',N"-tributyl-N,N',N"-trimethylolated melamine. Preferable among these examples is either or both of hexamethoxymethylated melamine or hexamethylenetetramine, and they should preferably be used in combination with the β-naphthol mentioned above.

The curing agent may be used in any amount without specific restrictions. Usually it is used in an amount of 1 to 10 parts by weight, particularly 1 to 7 parts by weight, for 100 parts by weight of the rubber component. With an amount less than 1 part by weight, it does not fully produce its effect of adding. With an amount more than 10 parts by weight, it is detrimental to the rubber properties and is wasted uneconomically.

The rubber composition of the present invention is usually incorporated with sulfur, organic sulfur compound, and any other vulcanizing agent in an unrestricted amount of 1 to 10 parts by weight, preferably 2 to 5 parts by weight, for 100 parts by weight of the rubber component. The vulcanizing agent may be used in combination with a vulcanization accelerator, such as zinc oxide and stearic acid, in an unrestricted amount of 1 to 20 parts by weight, preferably 3 to 15 parts by weight, for 100 parts by weight of the rubber component.

In addition, the rubber composition of the present invention may be incorporated with a variety of oils including paraffinic, naphthenic, or aromatic process oil, ethylene-α-olefin cooligomer, mineral oil such as paraffin wax and fluid paraffin, and vegetable oil such as castor oil, cotton seed oil, linseed oil, rapeseed oil, soybean oil, palm oil, coconut oil, and peanut oil. Preferable among these examples is aromatic process oil ("aroma oil"). They are added in an unrestricted amount of 1 to 10 parts by weight, preferably 2 to 7 parts by weight, for 100 parts by weight of the rubber component. The rubber composition may also be incorporated with a filler, such as carbon black, silica, calcium carbonate, calcium sulfate, clay, and mica, in an adequate amount according to its intended use. Of these fillers, carbon black is particularly desirable.

The rubber composition of the present invention may optionally be incorporated with a variety of additives according to need in an amount not harmful to the object of the present invention. Such additives include vulcanization accelerator such as sulfenamide, age resistor, wax, antioxidant, foaming agent, plasticizer, lubricant, tackifier, and UV absorber.

The rubber composition for conveyor belts according to the present invention can be firmly bonded to galvanized steel cords when vulcanized in close contact with them. In practice, this is accomplished by heating under pressure two sheets of the rubber composition holding galvanized steel cords between them. The condition of vulcanization varies depending on the vulcanizer and accelerator selected. Vulcanization with sulfur may be carried out at 135 to 180° C. for 10 to 100 minutes.

The conveyor belt formed with the rubber composition according to the present invention is not specifically restricted in its structure. It is usually constructed of a core and covering rubber layers holding it between them. The core includes galvanized steel cords covered by an adhesion rubber layer composed of the rubber composition of the present invention. The galvanized steel cords and the covering rubber layers are not specifically restricted in form and composition, respectively. Any known form and composition may be properly selected according to the use of the conveyor belt.

EXAMPLES

The invention will be described below in more detail with reference to Examples and Comparative Examples, which are not intended to restrict the scope thereof. The terms "parts" and "%" used in the examples imply "parts by weight" and "wt %," respectively.

Examples 1 to 5 and Comparative Examples 1 to 23

These examples are designed to produce samples of rubber compositions according to the formulation shown in Tables 1 and 2 given below and then test them for adhesion to galvanized steel cords, rate of vulcanization, rolling performance, and laminating performance. The results are also shown in Tables 1 and 2.

The components shown in Tables 1 and 2 are commercial products whose sources and trade names are listed below.
  Natural rubber: RSS #3
  Styrene-butadiene rubber: SBR 1500 (SBR produced by emulsion polymerization, made by JSR Corporation)
  Carbon black: Asahi Carbon Co., Ltd., "#70"
  Age resistor: Sumitomo Chemical Co., Ltd., "ANTIGENE 6C"
  Aromatic oil: Idemitsu Kosan Co., Ltd., "Diana Process Oil AH-85"
  Sulfur: Tsurumi Chemical Industry Co., Ltd., "Z Sulfur"
  Vulcanization accelerator: Ouchi Shinko Chemical Industrial Co., Ltd., "Nocceler NS—F"
  Zinc oxide: Toho Zinc Co., Ltd., "Ginrei SR"
  Zinc dimethacrylate: Kawaguchi Chemical Industry Co., Ltd., "Actor ZMA"
  Cobalt neodecanoate: DIC Corporation, "Cobalt Versatate"
  Cobalt neodecanoate boride: DIC Corporation, "DIC-NATE NBC-II"
  Cobalt naphthenate: DIC Corporation, "Cobalt naphthenate"
  Cobalt stearate: DIC Corporation, "Cobalt Stearate"
  Stearic acid: Kao Corporation, "LUNAC RA"
  Zinc salt of unsaturated fatty acid: Kawaguchi Chemical Industry Co., Ltd., "EXTON L2"
  Phenolic Resin-1: Sumitomo Bakelite Co., Ltd., "Sumilite Resin PR-50235"
  Phenolic Resin-2 (with internally added hexamethylenetetramine): Sumitomo Bakelite Co., Ltd., "Sumilite Resin PR-12687"
  β-Naphthol: Mitsui Fine Chemicals Inc., "2-naphthol"
  Hexamethoxymethylated melamine: Nihon Cytec Industries Inc., "CYREZ964RPC"

(1) Adhesion Test
  a. Preparation of Specimens
  The rubber composition for each Example was prepared by kneading the components shown in Tables 1 and 2 all at once in a Banbury mixer. The resulting rubber composition was made into a sheet (15 mm thick). The sheets were placed one over the other, with a galvanized steel cord (7 mm in diameter) held between them, and the resulting assembly was heated under pressure for vulcanization at 170° C. for 40 minutes. Thus there was obtained the specimen for test.
  b. Initial Adhesion Strength
  The specimen was tested for adhesion strength by measuring the power required for the galvanized steel cord to be pulled out from it. This test accords with DIN 22131. The results of the test are expressed in terms of index, with the value in Comparative Example 4 in Table 1 being 100. The larger the measured value, the greater the adhesion strength.
  c. Adhesion Strength after Heat Aging
  The same test as above was repeated for the specimen which had experienced heat aging at 145° C. for 300 minutes under pressure (2 MPa) exerted by a press.
  d. Adhesion Strength after Moisture Absorption
  The same test as above was repeated for the specimen which had been allowed to stand at 70° C. and 95% RH for 90 days.

(2) Rate of Vulcanization
  The specimen was tested for the rate of vulcanization at 155° C. in cure time of Tc(90) according to JIS K6300-2 by using "Curelastometer, type W" made by Nichigo Shoji Co., Ltd. The results of the test are expressed in terms of index, with the value in Comparative Example 4 being 100. The smaller the measured value Tc(90), the larger the index value.

(3) Rolling Performance
  A sample weighing 1.0 kg, which was taken from the unvulcanized rubber composition, underwent rolling for three minutes on "RII-2CC" (made by Kodaira Seisakusho Co., Ltd.) so that it was made into a three-mm thick sheet. During rolling performance, the sample was examined for its tackiness to the roll surface. The tackiness was rated as fine (⊚), good (○), and poor (X).

(4) Laminating Performance
  The test for laminating performance was conducted on a specimen as shown in FIG. 1, which was produced in the following manner. First, a rubber composition based on the formulation shown below was prepared by kneading in a Banbury mixer. This rubber composition was made into the covering rubber 1 (4 mm thick). Then, each of the rubber compositions prepared according to the formulations shown in Tables 1 and 2 was made into the adhesion rubber layer 2 (2 mm thick). Two pieces of the adhesion rubber layer 2 were placed one over the other, with the galvanized steel cords 3 (4 mm in diameter) interposed between them. The resulting laminate product was held between two pieces of the covering rubber 1, and the resulting assembly was pressed by a hand roller so that the individual layers are bonded together.

(Formulation for Covering Rubber Composition)

| | |
|---|---|
| Natural rubber (RSS #3) | 70 pbw |
| Styrene-butadiene rubber (SBR 1500, from JSR Corporation) | 30 pbw |
| HAF carbon | 55 pbw |
| Stearic acid (Kao Corporation, "LUNAC RA") | 3 pbw |
| ZnO | 3 pbw |
| Wax (Ouchi Shinko Chemical Industrial Co., Ltd., "Sunnoc N") | 2 pbw |
| Age resistor RD (Kawaguchi Chemical Industry Co., Ltd., "Antage RD") | 0.5 pbw |
| Age resistor 6C (Kawaguchi Chemical Industry Co., Ltd., "Antage 6C") | 0.5 pbw |
| Aromatic oil (Idemitsu Kosan Co., Ltd., "Diana Process Oil AH-85") | 5 pbw |
| Sulfur | 2 pbw |
| Vulcanization accelerator (Ouchi Shinko Chemical Industrial Co., Ltd., "Nocceler NS-F") | 0.7 pbw |

Each specimen thus obtained was peeled off by force at the interface between the covering rubber layer and the adhesion rubber layer. The adhesiveness of the layers was rated as good (○), fair (Δ), and poor (X) depending on whether they have sufficient adhesion strength or not.

TABLE 1

| | | Comparative Example | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Formulation (parts by weight) | Natural rubber | 40 | 40 | 40 | 40 | 40 | 40 | 40 | 40 | 40 | 40 | 40 | 40 | 40 |
| | Styrene-butadiene rubber | 60 | 60 | 60 | 60 | 60 | 60 | 60 | 60 | 60 | 60 | 60 | 60 | 60 |
| | Carbon black | 60 | 60 | 60 | 60 | 60 | 60 | 60 | 60 | 60 | 60 | 60 | 60 | 60 |
| | Age resistor | 2 | 2 | 2 | 2 | 2 | 2 | 2 | 2 | 2 | 2 | 2 | 2 | 2 |
| | Aromatic oil | 5 | 5 | 5 | 5 | 5 | 5 | 5 | 5 | 5 | 5 | 5 | 5 | 5 |
| | Sulfur | 3 | 3 | 3 | 3 | 3 | 3 | 3 | 3 | 3 | 3 | 3 | 3 | 3 |
| | Vulcanization accelerator | 1 | 1 | 1 | 1 | 1 | 1 | 1 | 1 | 1 | 1 | 1 | 1 | 1 |
| | Zinc oxide | 15 | 15 | 15 | 15 | 15 | 15 | 15 | 15 | 15 | 15 | 15 | 15 | 15 |
| | Zinc dimethacrylate | | 2 | | 2 | 2 | 2 | 2 | 2 | 2 | 2 | 2 | 2 | 2 |
| | Cobalt neodecanoate | | | 4 | 4 | | | | | | | | | |
| | Cobalt neodecanoate boride | | | | | 2.5 | | | | 2.5 | 2.5 | 1.5 | 3.5 | 4.5 |
| | Cobalt naphthenate | | | | | | 5.8 | | | | | | | |
| | Cobalt stearate | | | | | | | 6.1 | | | | | | |
| | Stearic acid | | | | | | | | | | | | | |
| | Zinc salt of unsaturated fatty acid | | | | | | | | | | | | | |
| | Phenolic resin-1 | | | | | | | | 3 | | | | | |
| | Phenolic resin-2 (with internally added hexamine) | | | | | | | | | 3 | 3 | 3 | 3 | 3 |
| | β-naphthol | | | | | | | | | | 2 | 2 | 2 | 2 |
| | Hexamethoxymethylated melamine | | | | | | | | | | 5 | 5 | 5 | 5 |
| Performance Test | Initial adhesion strength | 10 | 20 | 90 | 100 | 100 | 93 | 85 | 105 | 112 | 120 | 109 | 116 | 110 |
| | Adhesion strength after heat aging | 8 | 22 | 60 | 100 | 104 | 90 | 86 | 104 | 109 | 129 | 110 | 122 | 107 |
| | Adhesion strength after moisture absorption | 9 | 25 | 30 | 100 | 103 | 84 | 78 | 107 | 115 | 138 | 109 | 127 | 108 |
| | Rate of vulcanization (Curelastometer T90 at 155° C.) | 110 | 90 | 110 | 100 | 120 | 104 | 102 | 120 | 120 | 120 | 110 | 125 | 128 |
| | Rolling performance | ◉ | ○ | ◉ | ○ | ○ | X | ◉ | ○ | ○ | ○ | ○ | ○ | ○ |
| | Laminating performance | ○ | ○ | ○ | ○ | ○ | ○ | Δ | ○ | ○ | ○ | ○ | ○ | ○ |

TABLE 2

| | | Example | | | | | Comparative Example | | | | | | | | | |
|---|---|---|---|---|---|---|---|---|---|---|---|---|---|---|---|---|
| | | 1 | 2 | 3 | 4 | 5 | 14 | 15 | 16 | 17 | 18 | 19 | 20 | 21 | 22 | 23 |
| Formulation (parts by weight) | Natural rubber | 40 | 40 | 40 | 40 | 40 | 40 | 40 | 40 | 40 | 40 | 40 | 40 | 40 | 40 | 40 |
| | Styrene-butadiene rubber | 60 | 60 | 60 | 60 | 60 | 60 | 60 | 60 | 60 | 60 | 60 | 60 | 60 | 60 | 60 |
| | Carbon black | 60 | 60 | 60 | 60 | 60 | 60 | 60 | 60 | 60 | 60 | 60 | 60 | 60 | 60 | 60 |
| | Age resistor | 2 | 2 | 2 | 2 | 2 | 2 | 2 | 2 | 2 | 2 | 2 | 2 | 2 | 2 | 2 |
| | Aromatic oil | 5 | 5 | 5 | 5 | 5 | 5 | 5 | 5 | 5 | 5 | 5 | 5 | 5 | 5 | 5 |
| | Sulfur | 3 | 3 | 3 | 3 | 3 | 3 | 3 | 3 | 3 | 3 | 3 | 3 | 3 | 3 | 3 |
| | Vulcanization accelerator | 1 | 1 | 1 | 1 | 1 | 1 | 1 | 1 | 1 | 1 | 1 | 1 | 1 | 1 | 1 |
| | Zinc oxide | 15 | 15 | 15 | 15 | 15 | 15 | 15 | 15 | 15 | 15 | 15 | 15 | 15 | 15 | 15 |
| | Zinc dimethacrylate | 2 | 2 | 2 | 2 | 2 | 2 | 2 | 2 | 2 | 0.3 | 7 | 2 | 2 | 2 | 2 |
| | Cobalt neodecanoate | | 4 | 2 | | | | | | | | | 1.5 | 8 | | |
| | Cobalt neodecanoate boride | 2.5 | | 1.25 | 2.5 | 2.5 | 2.5 | 2.5 | 1 | 5 | 2.5 | 2.5 | | | 2.5 | 2.5 |
| | Cobalt naphthenate | | | | | | | | | | | | | | | |
| | Cobalt stearate | 1 | 1 | 1 | 0.5 | 2 | 0.1 | 3 | | | | | | | | |
| | Stearic acid | | | | | | | | | | | | | | 1 | |
| | Zinc salt of unsaturated fatty acid | | | | | | | | | | | | | | | 1 |
| | Phenolic resin-1 | | | | | | | | | | | | | | | |
| | Phenolic resin-2 (with internally added hexamine) | 3 | 3 | 3 | 3 | 3 | 3 | 3 | 3 | 3 | 3 | 3 | 3 | 3 | 3 | 3 |
| | β-naphthol | 2 | 2 | 2 | 2 | 2 | 2 | 2 | 2 | 2 | 2 | 2 | 2 | 2 | 2 | 2 |
| | Hexamethoxymethylated melamine | 5 | 5 | 5 | 5 | 5 | 5 | 5 | 5 | 5 | 5 | 5 | 5 | 5 | 5 | 5 |

TABLE 2-continued

|  |  | Example | | | | | Comparative Example | | | | | | | | | |
| --- | --- | --- | --- | --- | --- | --- | --- | --- | --- | --- | --- | --- | --- | --- | --- |
|  |  | 1 | 2 | 3 | 4 | 5 | 14 | 15 | 16 | 17 | 18 | 19 | 20 | 21 | 22 | 23 |
| Performance Test | Initial adhesion strength | 119 | 120 | 119 | 118 | 113 | 118 | 103 | 98 | 102 | 97 | 105 | 97 | 103 | 110 | 30 |
|  | Adhesion strength after heat aging | 127 | 124 | 128 | 128 | 112 | 128 | 98 | 99 | 80 | 70 | 110 | 96 | 75 | 105 | 82 |
|  | Adhesion strength after moisture absorption | 136 | 130 | 133 | 138 | 109 | 137 | 92 | 89 | 75 | 35 | 120 | 85 | 70 | 106 | 75 |
|  | Rate of vulcanization (Curelastometer T90 at 155° C.) | 120 | 100 | 110 | 120 | 120 | 120 | 115 | 105 | 130 | 125 | 85 | 102 | 107 | 122 | 118 |
|  | Rolling performance | ◎ | ◎ | ◎ | ◎ | ◎ | ○ | ◎ | ○ | X | ◎ | X | ○ | X | ◎ | ◎ |
|  | Laminating performance | ○ | ○ | ○ | ○ | ○ | ○ | Δ | ○ | ○ | ○ | ○ | ○ | ○ | X | X |

It is apparent from Tables 1 and 2 that the rubber composition for conveyor belts according to the present invention exhibits good adhesion to galvanized steel cords and achieves good rolling performance and good laminating performance, so that it permits efficient production of durable conveyor belts.

| EXPLANATION OF REFERENCE | |
| --- | --- |
| 1 | Covering rubber layer |
| 2 | Adhesion rubber layer |
| 3 | Galvanized steel cords |

The invention claimed is:

1. A rubber composition for conveyor belts, which comprises 0.5 to 3 parts by weight of zinc dimethacrylate, 1 to 10 parts by weight of a cobalt neodecanoate compound and 0.5 to 4 parts by weight of cobalt stearate for 100 parts by weight of rubber component.

2. The rubber composition for conveyor belts as defined in claim 1, in which the cobalt neodecanoate compound is either or both of cobalt neodecanoate and cobalt neodecanoate boride.

3. The rubber composition for conveyor belts as defined in claim 1, in which the rubber component is composed of 20 to 70 parts by weight of natural rubber and 80 to 30 parts by weight of synthetic rubber such that their total amount is 100 parts by weight.

4. The rubber composition for conveyor belts as defined in claim 3, in which said synthetic rubber is one or more species selected from styrene-butadiene rubber (SBR), butadiene rubber (BR), and isoprene rubber (IR).

5. The rubber composition for conveyor belts as defined in claim 1, which further contains 1 to 10 parts by weight of phenolic resin for 100 parts by weight of the rubber component.

6. The rubber composition for conveyor belts as defined in claim 5, in which the phenolic resin is one which contains internally added hexamethylenetetramine.

7. The rubber composition for conveyor belts as defined in claim 1, which further contains 1 to 10 parts by weight of β-naphthol for 100 parts by weight of the rubber component.

8. The rubber composition for conveyor belts as defined in claim 1, which further contains 1 to 10 parts by weight of hexamethoxymethylated melamine and/or hexamethylenetetramine as a curing agent for 100 parts by weight of the rubber component.

9. A conveyor belt composed of covering rubber layers and a core of galvanized steel cords interposed between them which is coated with an adhesion rubber layer, characterized in that said adhesion rubber layer is formed from the rubber composition defined in claim 1.

* * * * *